US010140710B2

(12) United States Patent
Kreeger

(10) Patent No.: US 10,140,710 B2
(45) Date of Patent: Nov. 27, 2018

(54) AUTOMATIC KEY FRAME DETECTION

(71) Applicant: Kevin Augustus Kreeger, Discovery Bay, CA (US)

(72) Inventor: Kevin Augustus Kreeger, Discovery Bay, CA (US)

( * ) Notice: Subject to any disclaimer, the term of this patent is extended or adjusted under 35 U.S.C. 154(b) by 153 days.

(21) Appl. No.: 15/454,613

(22) Filed: Mar. 9, 2017

(65) Prior Publication Data

US 2018/0260949 A1 Sep. 13, 2018

(51) Int. Cl.
*G06K 9/00* (2006.01)
*G06T 7/00* (2017.01)

(52) U.S. Cl.
CPC .. *G06T 7/0012* (2013.01); *G06T 2207/30068* (2013.01); *G06T 2207/30096* (2013.01)

(58) Field of Classification Search
None
See application file for complete search history.

(56) References Cited

U.S. PATENT DOCUMENTS 7,783,094 B2 8/2010 Collins

OTHER PUBLICATIONS

Krishna, K. Divya et al.; FPGA based Preliminary CAD for Kidney on IoT Enabled Portable Ultrasound Imaging System; IEEE 16th International Conference on e-Health Networking, Applications and Services (Healthcom); 2014.

*Primary Examiner* — Atiba O Fitzpatrick
(74) *Attorney, Agent, or Firm* — James M. Smedley LLC; James Michael Smedley, Esq.

(57) ABSTRACT

Apparatus and associated methods relate to estimating the key image degree of adequacy of a captured image as a function of tissue image features and a degree of abnormality based on the tissue image features for each image of a real-time series of images captured by an imaging system, and automatically identifying key images based on the key image degree of adequacy. In an illustrative example, the image may be captured by an ultrasound imaging device. The tissue may be, for example, breast tissue examined to detect cancer. In various implementations, the key image degree of adequacy may be determined based on tissue features representative of diseased tissue, and a key image may be selected based on a degree of abnormality determined as a function of the diseased tissue features. Various examples may advantageously provide faster, less expensive, and more accurate initial disease detection by non-radiologist operators.

20 Claims, 12 Drawing Sheets

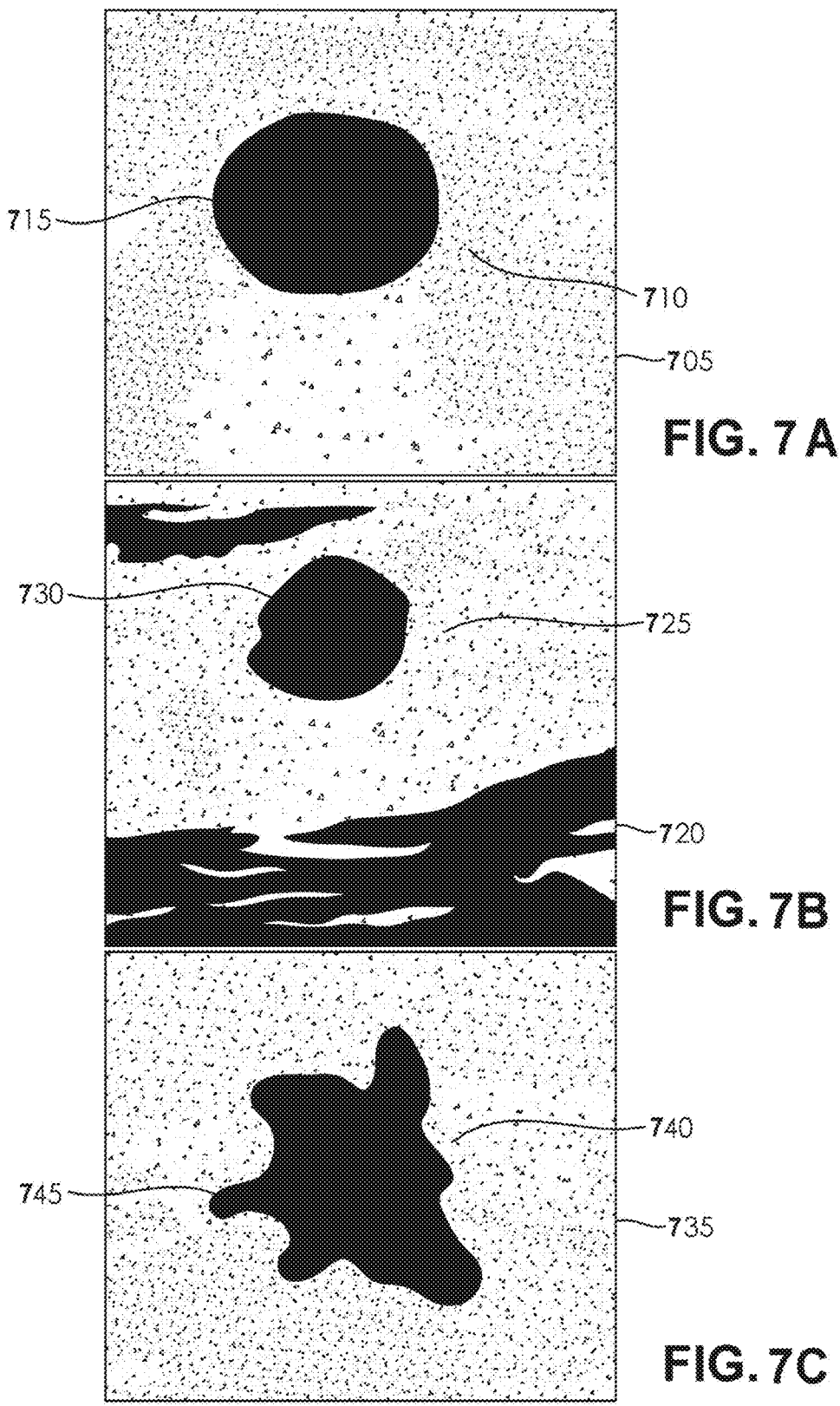

AUTOMATIC KEY FRAME DETECTION

TECHNICAL FIELD

Various embodiments relate generally to key frame detection in medical imaging.

BACKGROUND

Medical images are images used in disease detection. Disease screening is an important preventive health care component. Some disease may be detected in medical images before other symptoms present. Some disease may be more effectively treated or even cured if detected early enough. Disease may be detected by a radiologist based on analysis of tissue features in medical images. A radiologist is a medical doctor specially trained to detect disease in medical images. The radiologist may study tissue features in medical images captured during a medical imaging procedure.

Radiologist detection of disease may be supplemented with CAD (Computer-aided Detection). CAD algorithms may detect disease in medical images based on analysis of tissue features in the images. CAD may analyze medical images to determine a Degree of Abnormality or a Probability of Malignancy based on anomaly detection, feature detection, and image processing techniques. Effective diagnosis and screening may require thorough imaging coverage and adequate image quality. A radiologist or CAD may be presented with only a specific subset of images selected from the many potential images generated from an imaging procedure.

The images presented to a radiologist or analyzed by CAD may be known as key frames. The key frames may be selected based on specific view orientations or tissue features needed for thorough analysis or screening. Selection of the key frames requires a high degree of medical imaging skill and knowledge of tissue features. A radiologist may be required to perform the imaging procedure and select the key frames to ensure adequate imaging for effective screening. Using a highly-trained radiologist to perform an imaging procedure and select the key frames adds cost to an already expensive health care system. Screening effectiveness may be reduced if key frames selected by un-aided non-radiologist imaging system operators are presented to the radiologist or CAD.

SUMMARY

Apparatus and associated methods relate to estimating the key image degree of adequacy of a captured image as a function of tissue image features and a degree of abnormality based on the tissue image features for each image of a real-time series of images captured by an imaging system, and automatically identifying key images based on the key image degree of adequacy. In an illustrative example, the image may be captured by an ultrasound imaging device. The tissue may be, for example, breast tissue examined to detect cancer. In various implementations, the key image degree of adequacy may be determined based on tissue features representative of diseased tissue, and a key image may be selected based on a degree of abnormality determined as a function of the diseased tissue features. Various examples may advantageously provide faster, less expensive, and more accurate initial disease detection by non-radiologist operators.

Apparatus and associated methods relate to automatically choosing radiological diagnosis key images selected from a real-time series of captured diagnostic tissue images as a function of predetermined key image set adequacy criteria until the key image set adequacy criteria are satisfied, and indicating the Probability of Malignancy determined based on Computer-aided abnormality Detection of the radiological diagnosis key image set. In an illustrative example, the diagnostic image may be captured by an ultrasound imaging device. The tissue may be, for example, breast tissue examined to detect the presence of cancer. In various implementations, the predetermined key image set criteria may be tissue features representative of healthy tissue, and a key image may be selected based on a required set of imaging device orientations, tissue feature views, and the estimated Probability of Malignancy. Various examples may advantageously provide faster, less expensive, and more accurate initial disease detection by non-radiologist operators.

Various embodiments may achieve one or more advantages. For example, some embodiments may improve the quality of medical key images provided to a radiologist for disease detection. This facilitation may be a result of automatically selecting medical key images satisfying predetermined key image set criteria. In an illustrative example, the predetermined key image set criteria may include the number of images, imaging view orientations, and tissue features required to obtain tissue feature coverage adequate for radiologist diagnosis. In some embodiments, the cost of medical imaging procedures may be reduced. Such cost reduction may be a result of automatically guiding less expensive non-radiologist imaging operators to facilitate imaging sensor orientations to obtain a key image set adequate for radiologist evaluation.

In some embodiments, the accuracy of disease detection may be improved. This facilitation may be a result of automatically selecting medical image key frames based on a Degree of Abnormality or a Probability of Malignancy. In an illustrative example, a medical image may be automatically selected as a key image based on the Probability of Malignancy or Degree of Abnormality determined by Computer-aided Detection. For example, a medical image may be automatically selected as a key image based on a threshold Probability of Malignancy or Degree of Abnormality. Various examples may increase the availability of health care. Such increase in health care availability may be a result of more efficient time allocation of more highly skilled imaging personnel. For example, automatic selection of medical key images may permit increased use of non-radiologist operators to perform initial imaging procedures, freeing more highly skilled radiologists for medically critical or value-added tasks.

The details of various embodiments are set forth in the accompanying drawings and the description below. Other features and advantages will be apparent from the description and drawings, and from the claims.

BRIEF DESCRIPTION OF THE DRAWINGS

FIGS. 7A-7C depict an embodiment image processing system colorized lesion indication of the Degree of Abnormality of breast tissue images.

Like reference symbols in the various drawings indicate like elements.

DETAILED DESCRIPTION OF ILLUSTRATIVE EMBODIMENTS

To aid understanding, this document is organized as follows. First, illustrative examples of an embodiment image processing system estimating the key image degree of adequacy of a captured image as a function of tissue image features and a degree of abnormality based on the tissue image features for each image of a real-time series of images captured by the imaging system, and automatically identifying key images based on the key image degree of adequacy, are briefly introduced with reference to FIG. 1. Second, with reference to FIG. 2, the discussion turns to exemplary systems that illustrate the structure and design of an embodiment image processing system. Specifically, the system block diagram of an imaging system that automatically selects radiological key images from a real-time series of captured tissue images is disclosed. Then, with reference to FIG. 3, an illustrative process flow of an exemplary Key Frame Analytic Engine (KFAE) automatically selecting radiological key images is described. Next, an illustrative example of automatic key frame selection based on real-time Degree of Abnormality analysis of captured images is graphically presented with reference to FIGS. 4A and 4B. Next, with reference to FIGS. 5-7, illustrative Degree of Abnormality indications by embodiment image processing systems are presented. Then, with reference to FIG. 8, an exemplary image processing system automatically choosing radiological key images selected from a real-time series of captured tissue images as a function of predetermined key image set adequacy criteria is disclosed. Next, an illustrative process flow of an exemplary Image Acquisition Engine (IAE) capturing and analyzing images is presented with reference to FIG. 9. Then, with reference to FIG. 10, an exemplary process flow of an embodiment Key Frame Selection Engine (KFSE) selecting key frames from a captured image stream is described. Finally, an illustrative process flow of an exemplary Key Frame Set Analytic Engine (KFSAE) selecting key frames based on predetermined key frame set adequacy criteria is disclosed with reference to FIG. 11.

Figure 1:
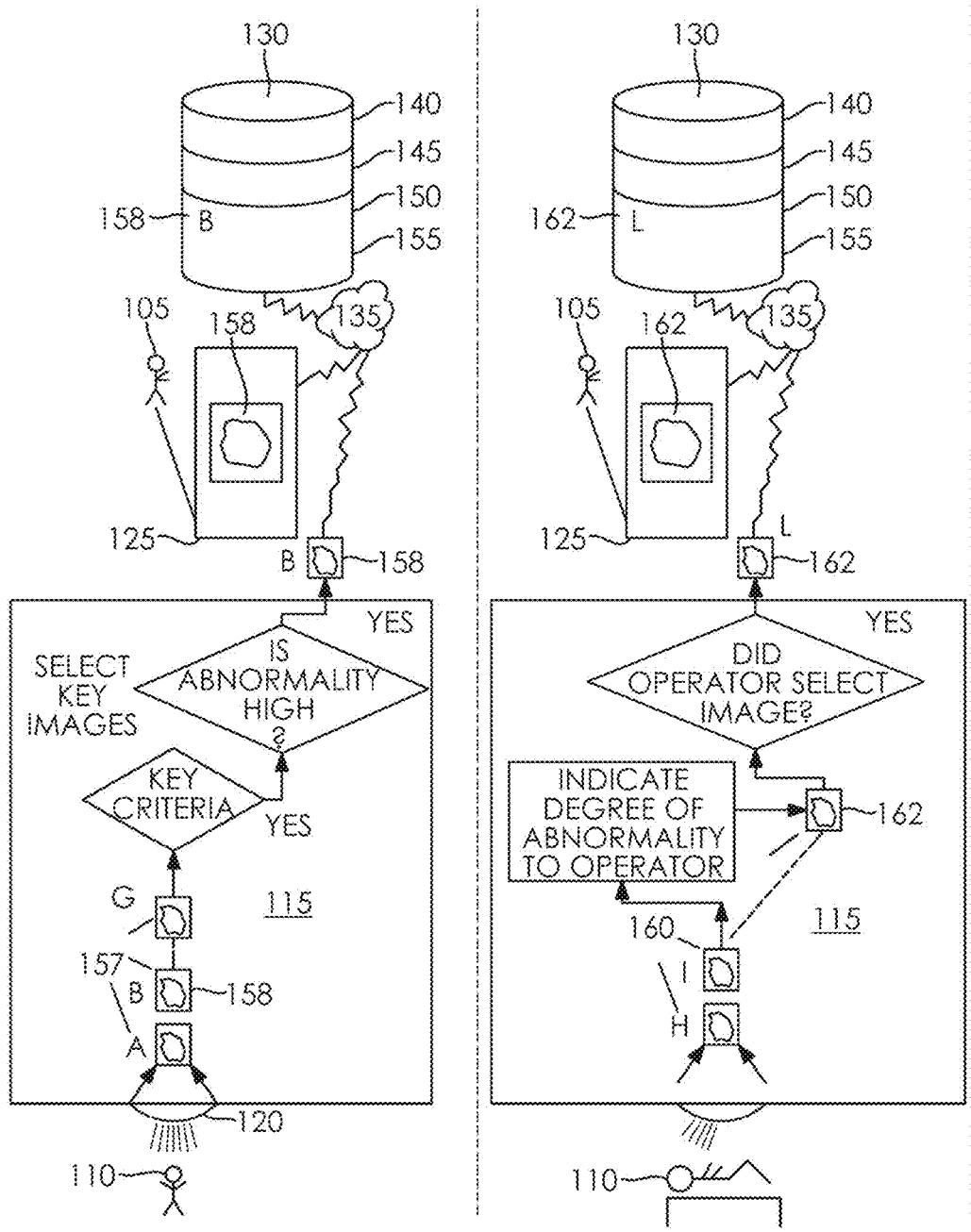
FIG. 1 depicts an exemplary image processing system estimating the key image degree of adequacy of a captured image as a function of tissue image features and a degree of abnormality based on the tissue image features for each image of a real-time series of images captured by an imaging system, and automatically identifying key images based on the key image degree of adequacy.

FIG. 1 depicts an exemplary image processing system estimating the key image degree of adequacy of a captured image as a function of tissue image features and a degree of abnormality based on the tissue image features for each image of a real-time series of images captured by an imaging system, and automatically identifying key images based on the key image degree of adequacy. In FIG. 1, operator 105 examines patient 110 using exemplary image processing system 115. The image processing system 115 is configured with imaging sensor 120 to capture a real-time series of images of patient 110. The image processing system 115 is configured with user interface 125 adapted to interact with the operator 105. In the depicted embodiment, the operator 105 may configure and direct image processing system 115 via the user interface 125 to perform imaging operations. In the illustrated example, the image processing system 115 may display images and results of image-based Computer-aided Detection to the operator 105 via the user interface 125. In the depicted example, the image processing system 115 is operably and communicatively coupled with database 130 and user interface 125 via network cloud 135. In an illustrative example, the depicted database 130 retains records representative of tissue features 140, key image adequacy criteria 145, and selected key images 150. In various embodiments, the tissue features 140 may include image features representative of diseased and healthy tissue, derived by image processing and pattern analysis techniques. In an illustrative example of automatically selecting key images, the image processing system 115 captures a first series of images 157 of the patient 110 in a first patient orientation, using imaging sensor 120. In the depicted example, and for purpose of discussion, the first series of images 157 are labeled in alphabetic order A, B, . . . G. In the illustrated embodiment, the image processing system 115 evaluates each of the first series of images 157 based on tissue features 140 and key image adequacy criteria 145 to determine if each of the first series of images 157 satisfy a required key image degree of adequacy. In the depicted embodiment, the key image adequacy criteria 145 include a Degree of Abnormality target value. In the illustrated example, the image processing system 115 automatically selects image 'B' 158 as a key image from the first series of images 157, based on the image 'B' 158 Degree of Abnormality determined as a function of tissue features 140 and image 'B' 158 features analyzed by the image processing system 115. In the depicted example, the selection of image 'B' 158 as a key image is based on a determination by the image processing system 115 that the image 'B' 158 satisfies the key image adequacy criteria 145 and the Degree of Abnormality target value. In an illustrative example, the Degree of Abnormality target value may be a predetermined threshold Degree of Abnormality. In the illustrated example, the image processing system 115 stores the selected key image 'B' 158 as a key image 150 in database 130.

In an illustrative example of key frame selection based on indicating the captured image Degree of Abnormality to an operator, the image processing system 115 continues to capture a second series of images 160 of the patient 110 in a second patient orientation, using imaging sensor 120. In the depicted example, and for purpose of discussion, the second series of images 160 are labeled in alphabetic order H, I, . . . L. In an illustrative example, each of the second series of images 160 captured by the imaging processing system 115 may be displayed via the user interface 125 to the operator 105. In the illustrated embodiment, the image processing system 115 evaluates each of the second series of images 160 based on tissue features 140, and key image adequacy criteria 145, to determine the Degree of Abnormality of each of the second series of images 160 captured by the image processing system 115. In the depicted embodiment, the image processing system 115 may indicate the Degree of Abnormality determined for each of the second series of images 160 to operator 105 via user interface 125. In the illustrated example, the operator 105 selects image 'L' 162 as a key image based on the Degree of Abnormality indicated to the operator 105 via user interface 125. In the depicted embodiment, the image processing system 115 stores the selected key image 1' 162 as a key image 150 in database 130.

Figure 2:
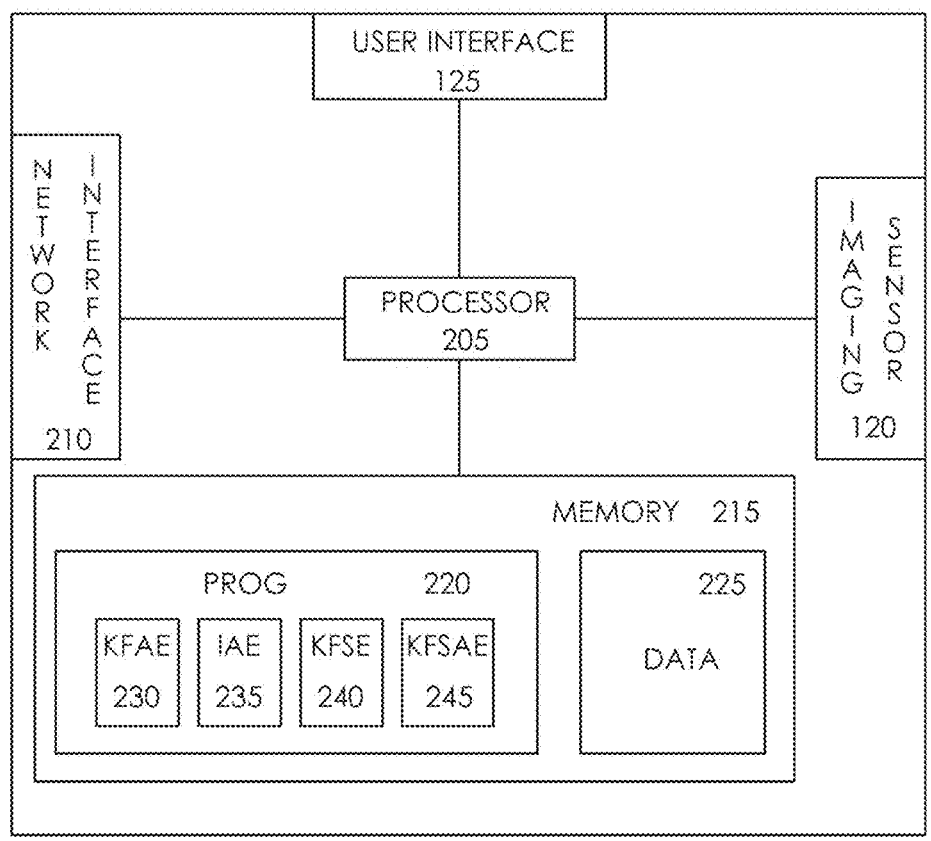
FIG. 2 depicts a structural overview of an exemplary image processing system.

FIG. 2 depicts a structural overview of an exemplary image processing system. In FIG. 2, a block diagram of an exemplary diagnostic image processing system 115 includes processor 205, network interface 210, user interface 125, imaging sensor 120, and memory 215. The processor 205 is in electrical communication with the memory 215. The depicted memory 215 includes program memory 220 and data memory 225. The program memory 220 includes processor-executable program instructions implementing KFAE (Key Frame Analytic Engine) 230, IAE (Image Acquisition Engine) 235, KFSE (Key Frame Selection Engine) 240, and KFSAE (Key Frame Set Analytic Engine) 245. In the depicted embodiment the processor 205 is communicatively and operably coupled with the network interface 210, user interface 125, and imaging sensor 120. In various implementations, the network interface 210 may be a wireless network interface. In some designs, the network interface 210 may be a wireline interface. In some designs, the network interface 210 may be omitted. In various implementations, the user interface 125 may be adapted to receive input from a user or send output to a user. In some embodiments, the user interface 125 may be adapted to an input-only or output-only user interface mode. In various implementations, the user interface 125 may be an imaging display. In some designs, the user interface 125 may be touch-sensitive. In some designs, the diagnostic image processing system 115 may include an accelerometer operably coupled with the processor 205. In some examples, the imaging sensor 120 may be an ultrasound scanner adapted to capture Ultrasound images. In various embodiments, the imaging sensor 120 may be a diagnostic X-ray imaging subsystem adapted to capture X-ray images. In an illustrative example, the imaging sensor 120 may be a diagnostic CAT scanner adapted to capture CAT images. In various implementations, the imaging sensor 120 may be a diagnostic MRI scanner adapted to capture MRI images. In some designs, the imaging sensor 120 may be a diagnostic PET scanner adapted to capture PET images. In some embodiments, the imaging sensor 120 may include subsystems or modules configurable by the processor 205 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, Computer-aided Detection, or anomaly detection. In various implementations, the depicted memory 220 may contain processor executable program instruction modules configurable by the processor 205 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, Computer-aided Detection, or anomaly detection.

Figure 3:
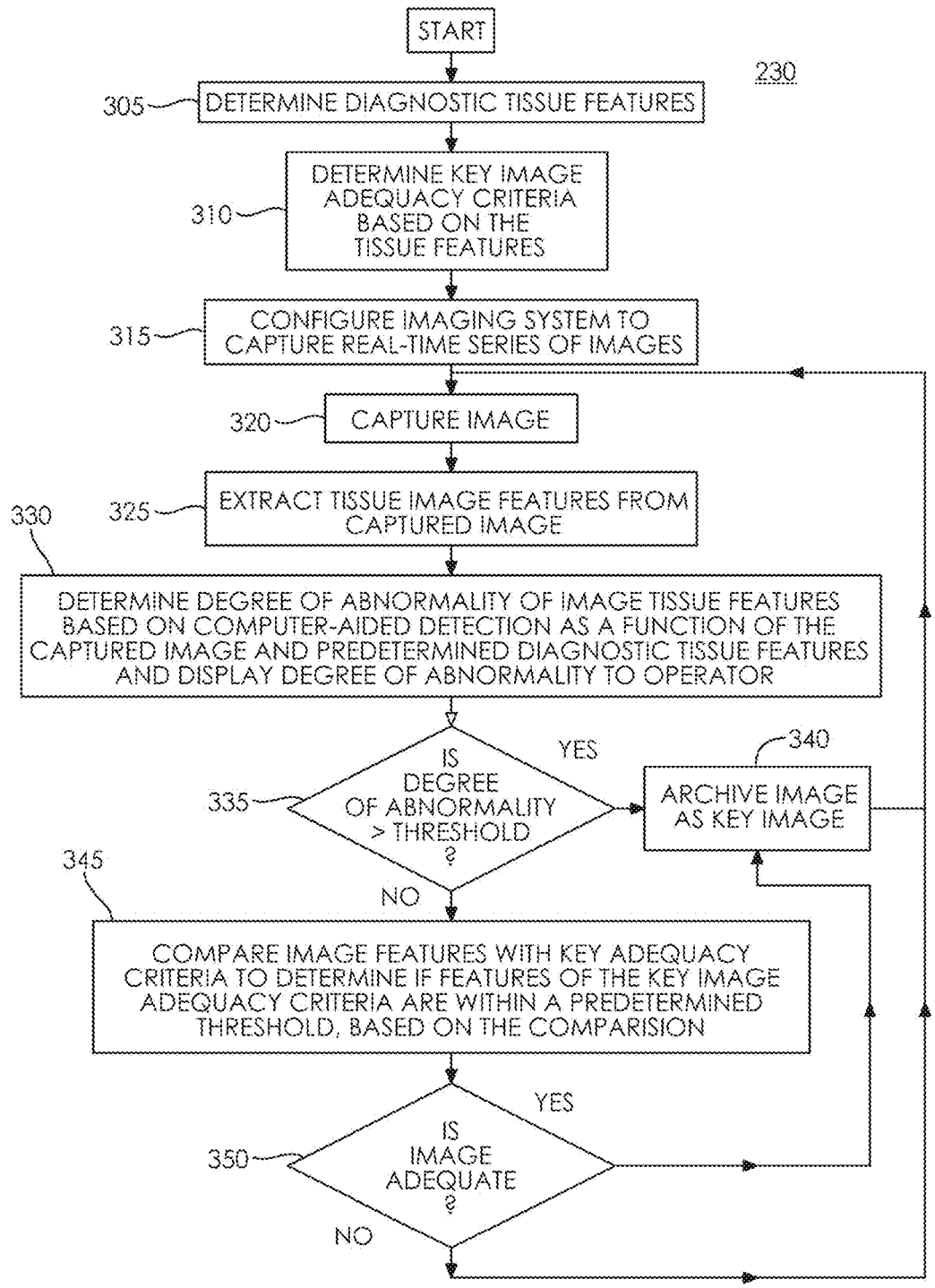
FIG. 3 depicts an illustrative process flow of an exemplary Key Frame Analytic Engine (KFAE).

FIG. 3 depicts an illustrative process flow of an exemplary Key Frame Analytic Engine (KFAE). In FIG. 3, an embodiment KFAE 230 process flow is depicted automatically selecting radiological key images from a real-time series of captured images. The method depicted in FIG. 3 is given from the perspective of the KFAE 230 executing as program instructions on processor 205 of image processing system 115, depicted in FIG. 2. In some embodiments, the KFAE 230 may execute as a cloud service governed by the processor 205 via network cloud 135. The depicted method begins at step 305 with the processor 205 determining diagnostic tissue image features. In some embodiments, the diagnostic tissue image features may include features representative of healthy tissue. In various designs, the diagnostic tissue image features may include features representative of diseased tissue. In an illustrative example, the diagnostic tissue image features may include features representative of breast cancer. The method continues at step 310 with the processor 205 determining key image adequacy criteria 145 based on the diagnostic tissue image features. In an illustrative example, the image adequacy criteria 145 may include tissue image features derived by image processing and pattern analysis techniques. In an illustrative example, the key image adequacy criteria 145 may include the quality of an image, and the noise level of an image. The method continues at step 315 with the processor 205 configuring the image processing system to capture a real-time series of images. The method continues at step 320 with the processor 205 capturing a real-time series of images. The method continues at step 325 with the processor 205 extracting tissue image features from the captured images. The method continues at step 330 with the processor 205 determining the degree of abnormality of the captured image tissue features based on Computer-aided Detection as a function of the captured images and predetermined diagnostic tissue image features and displaying the degree of abnormality to the operator 105 via the user interface 125. The method continues at step 335 with the processor 205 comparing the degree of abnormality of the captured image determined by the processor 205 at step 330 with a predetermined threshold. If at step 335 the processor 205 determines the degree of abnormality of the captured image exceeds the predetermined threshold, the method continues at step 340 with the processor 205 archiving the captured image as a key image, and the method continues at step 320 with the processor 205 capturing a real-time series of images. If at step 335 the processor 205 determines the degree of abnormality of the captured image does not exceed the predetermined threshold, the method continues at step 345 with the processor 205 comparing features extracted from the captured image with key image adequacy criteria to determine if the features match the key image adequacy criteria within a predetermined threshold, based on the comparison. The method continues at step 350 with the processor 205 determining if the captured image is adequate as a key image, based on the determination by the processor 205 at step 345 of the captured image feature matching with the key image adequacy criteria. If at step 350, the processor 205 determines the captured image is adequate as a key image based on the comparison by the processor 205 at step 345, the method continues at step 340 with the processor 205 archiving the captured image as a key image, and the method continues at step 320 with the processor 205 capturing a real-time series of images. If at step 350, the processor 205 determines the captured image is not adequate as a key image based on the comparison by the processor 205 at step 345, the method continues at step 320 with the processor 205 capturing a real-time series of images.

Figure 4A:
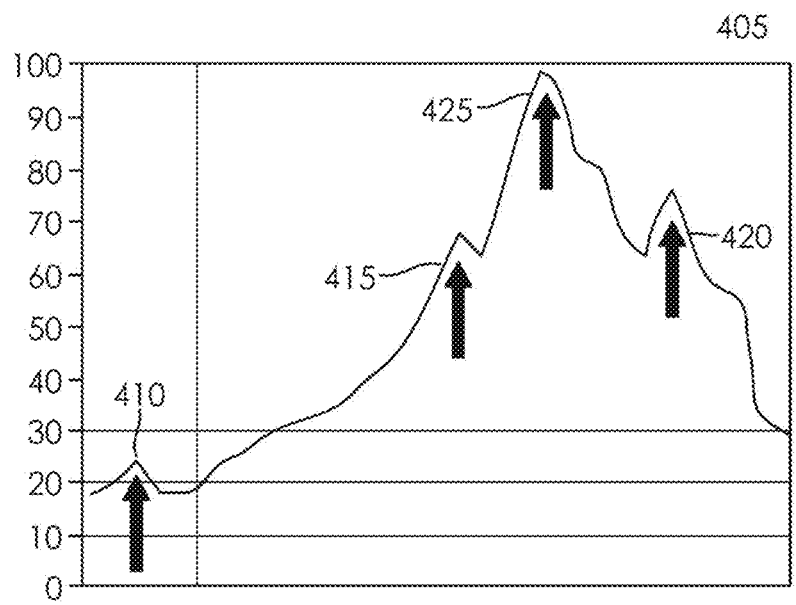
FIG. 4A depicts an illustrative peak-value Degree of Abnormality graph of captured images analyzed in real-time by an embodiment image processing system.

FIG. 4A depicts an illustrative peak-value Degree of Abnormality graph of captured images analyzed in real-time by an embodiment image processing system. In FIG. 4A, an exemplary diagnostic image processing system 115 is estimating the Degree of Abnormality of a real-time series 405 of images captured as the operator is reorienting a handheld scanner. In the depicted embodiment, the Degree of Abnormality value estimated for each captured image by the image processing system 115 in real-time is used to select key images. In an illustrative example, key images may also be selected by the image processing system, 115 based on comparing tissue image features of a captured image to tissue image features of other images. In the illustrated example, a key image may be selected by the image processing system 115 based on comparing the Degree of Abnormality estimated for an image to a predetermined threshold. In some embodiments, the key image may be selected by the image processing system 115 based on comparing the Degree of Abnormality estimated for an image to the Degree of Abnormality estimated for other images. In some embodiments, key images may also be selected based on comparison of tissue image features among images captured from related imaging device orientations. In the depicted embodiment, the image processing system 115 captures an image from a first imaging device orientation, and determines the Degree of Abnormality 410 is low based on comparison with a predetermined threshold. In an illustrative example, the image associated with the low Degree of Abnormality 410 is not archived as a key image by image processing system 115. In the illustrated example, the image processing system 115 captures two more images, from respective second and third imaging device orientations, and estimates their respective Degrees of Abnormality 415 and 420. The image processing system 115 estimates the respective Degrees of Abnormality 415 and 420 as medium based on comparison with a predetermined threshold and tissue image feature comparison to the related image having Degree of Abnormality 410. In the illustrated embodiment, the images associated with the medium Degrees of Abnormality 415 and 420 are not archived as key images by image processing system 115, but are retained for comparison of tissue image features and Degree of Abnormality with related images. In the depicted embodiment, the image processing system 115 captures an image from a fourth imaging device orientation, and determines the Degree of Abnormality 425 is high based on comparison with a predetermined threshold and comparison of the tissue image features to the images associated with the medium Degrees of Abnormality 415 and 420. In the depicted embodiment, the image associated with the high Degree of Abnormality 425 is archived by image processing system 115 as a key image. In various embodiments, the image processing system 115 may automatically capture key images based on the estimated Degree of Abnormality measure determined for every image in the image stream. In some designs, the image processing system 115 may employ peak detection to select key images from the image stream. In various implementations, the image processing system 115 may smooth the stream of estimated Degree of Abnormality measures to choose key images from true global maxima and not local maximum. In some designs, automatically identified key images could be sent to a long term archive, or reviewed by the operator 105 to only archive images selected by the operator 105.

Figure 4B:
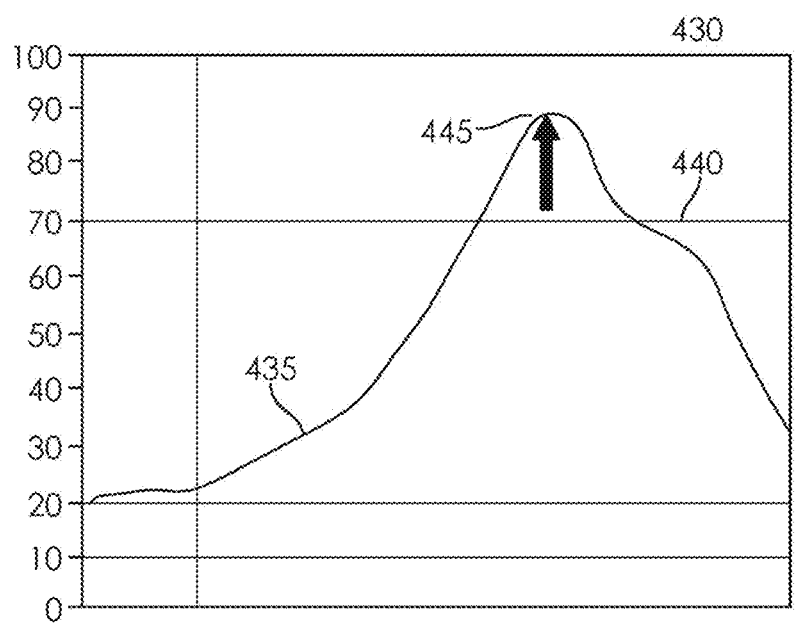
FIG. 4B depicts an illustrative smoothed-value Degree of Abnormality graph of captured images analyzed in real-time by an embodiment image processing system.

FIG. 4B depicts an illustrative smoothed-value Degree of Abnormality graph of captured images analyzed in real-time by an embodiment image processing system. In FIG. 4B, an exemplary image processing system 115 is estimating the Degree of Abnormality of a real-time series 430 of images captured as the operator is reorienting a handheld scanner. In the depicted embodiment, the Degree of Abnormality value estimated for each of a series of captured diagnostic images is smoothed by the image processing system 115 in real-time and the smoothed Degree of Abnormality is used to select key images. In the illustrated example, a first subset of the series of Degrees of Abnormality 430 are transformed by the image processing system 115 to a first smoothed low Degree of Abnormality 435. In the depicted example, the captured images associated with the first smoothed low Degree of Abnormality 435 are not archived as key images by the image processing system 115. In the illustrated embodiment, a second subset of the series of Degrees of Abnormality 430 are transformed by the image processing system 115 to a second smoothed medium Degree of Abnormality 440. In the depicted embodiment, the operator adjusts the smoothing parameters or thresholds while inspecting the historical captured images and an image having peak Degree of Abnormality 445 is discovered by the image processing system 115 in the captured series of images. The image associated with peak Degree of Abnormality 445 is archived as a key image by the image processing system 115. In some embodiments the image processing system 115 may employ a local moving window average to smooth the real-time Degree of Abnormality values. In various examples the local moving window average may have parameters configurable by the processor 205 including moving window length, or number of samples. In some designs, the image processing system 115 may employ a low-pass filter to smooth the real-time Degree of Abnormality values. In various examples the low-pass filter may have parameters configurable by the processor 205 including frequency response, cutoff frequency, roll off, and attenuation. In various examples the local moving window average parameters or low-pass filter parameters may be configurable by a user through the user interface 125. In some embodiments, the local moving window average parameters or low-pass filter parameters may be dynamically adapted by the user through the user interface 125 while reviewing historical image data.

Figures 5A, 5B, 5C:
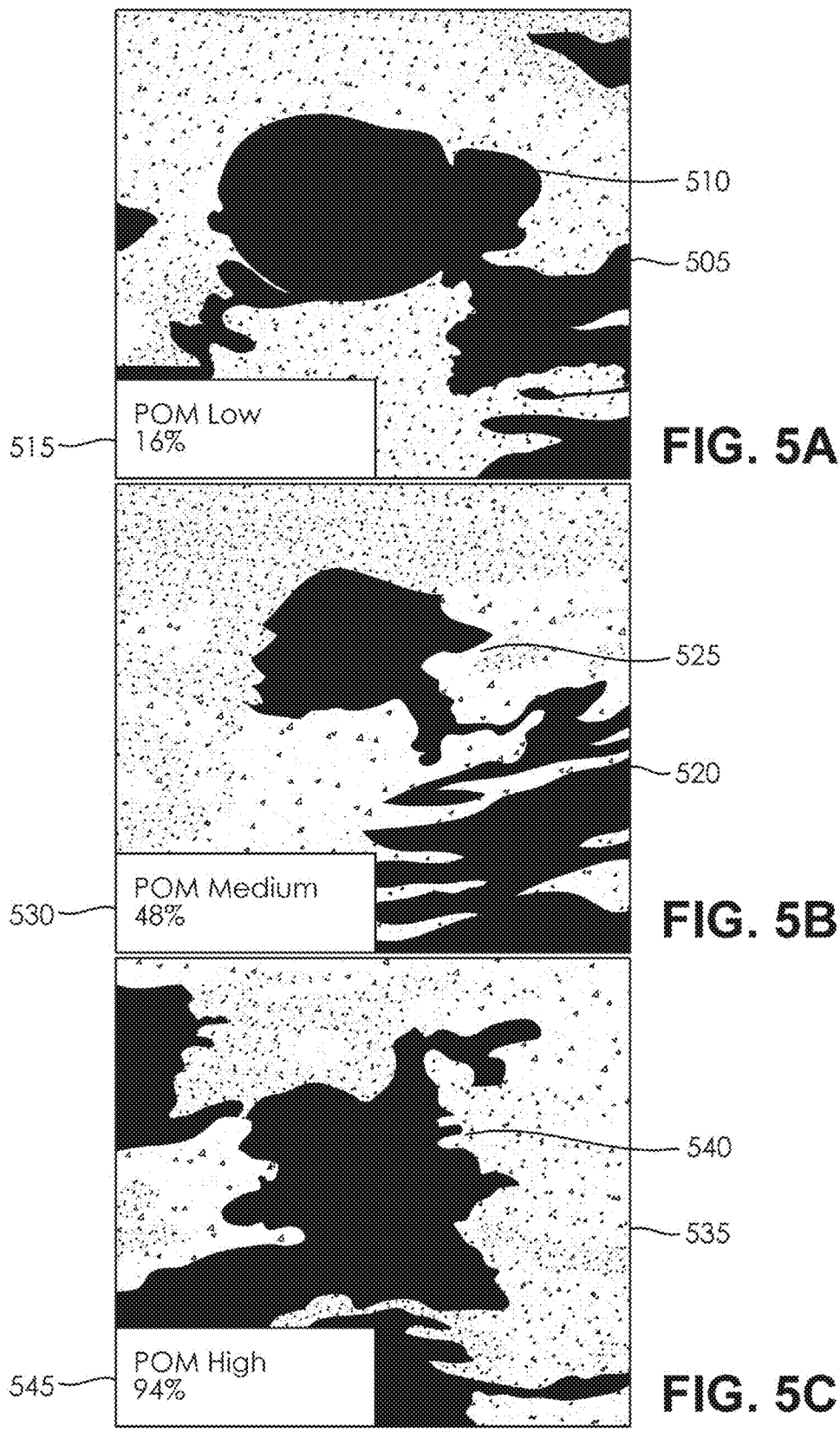
FIGS. 5A-5C depict an embodiment image processing system text indication of the Degree of Abnormality of breast tissue images.

FIGS. 5A-5C depict an embodiment image processing system text indication of the Degree of Abnormality of breast tissue images. In FIG. 5A, breast tissue image 505 has been captured by an exemplary image processing system 115. In various embodiments, the Degree of Abnormality or comparative threshold data may be annotated in text on an image display presented to the operator 105 via user interface 125. In the illustrated example, the Degree of Abnormality is mapped to a Probability of Malignancy by the image processing system 115 as a function of tissue image features 140. In some implementations, the Degree of Abnormality may be added to metadata and stored with a related image in database 130. The depicted diagnostic image 505 displays breast tissue feature 510. In an illustrative example, the exemplary image processing system 115 has estimated the breast tissue feature 510 Probability of Malignancy 515 as 16% based on image processing, image analysis, and Computer-aided Detection on the image 505. In the depicted example, the Probability of Malignancy 515 is identified as "Low" by comparison with a predetermined threshold and indicated in a text display on the image. In FIG. 5B, breast tissue image 520 has been captured by an exemplary image processing system 115. The depicted image 520 displays breast tissue feature 525. In an illustrative example, the exemplary image processing system 115 has estimated the breast tissue feature 525 Probability of Malignancy 530 as 48% based on image processing, image analysis, and Computer-aided Detection on the image 520. In the depicted example, the Probability of Malignancy 530 is identified as "Medium" by comparison with a predetermined threshold and indicated in a text display on the image. In FIG. 5C, breast tissue image 535 has been captured by an exemplary image processing system 115. The depicted image 535 displays breast tissue feature 540. In an illustrative example, the exemplary image processing system 115 has estimated the breast tissue feature 540 Probability of Malignancy 545 as 94% based on image processing, image analysis, and Computer-aided Detection on the image 535. In the depicted example, the Probability of Malignancy 545 is identified as "High" by comparison with a predetermined threshold and indicated in a text display on the image.

Figures 6A, 6B, 6C:
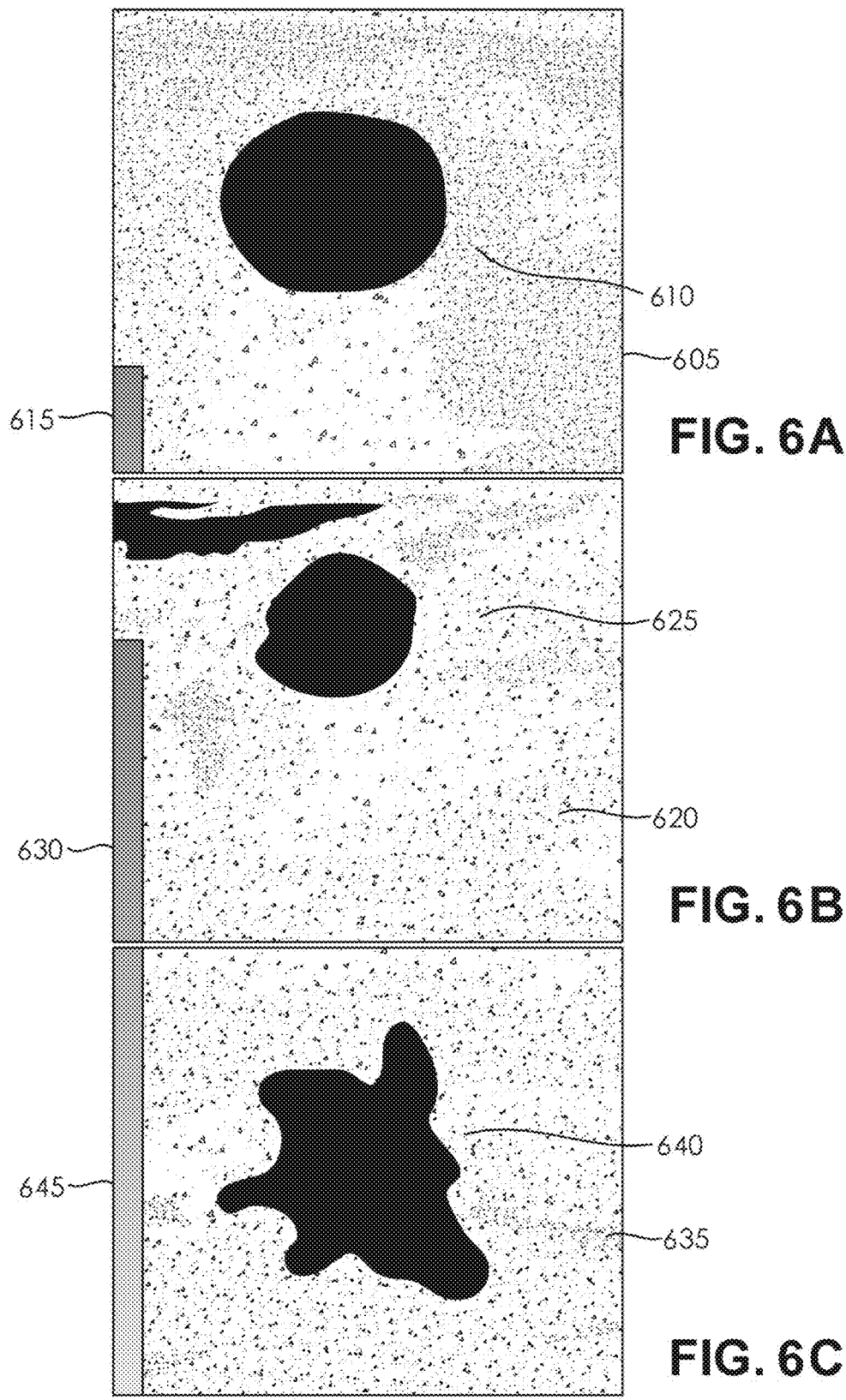
FIGS. 6A-6C depict an embodiment image processing system heat map indication of the Degree of Abnormality of breast tissue images.

FIGS. 6A-6C depict an embodiment image processing system heat map indication of the Degree of Abnormality of breast tissue images. In the illustrated example, the Degree of Abnormality is mapped to a Probability of Malignancy by the image processing system 115 as a function of tissue image features 140. In some implementations, the Degree of Abnormality may be added to metadata and stored with a related image in database 130. In the depicted embodiment, the heat map indication may represent the Degree of Abnormality value on a color spectrum, with blue being the lowest and red being the highest. In various embodiments, the Degree of Abnormality or comparative threshold data may be annotated in a heat map indication on an image display presented to the user via the user interface 125. In FIG. 6A, breast tissue image 605 has been captured by an exemplary image processing system 115. The depicted image 605 displays breast tissue feature 610. In an illustrative example, the exemplary image processing system 115 has estimated the breast tissue feature 610 Degree of Abnormality 615 as 16% based on image processing, image analysis, and Computer-aided Detection on the image 605. In the depicted example, the Degree of Abnormality 615 is identified as "Low" by comparison with a predetermined threshold and indicated on a vertical colorized heat map extending to light blue just above the bottom left from dark blue at the bottom left. In FIG. 6B, breast tissue image 620 has been captured by an exemplary image processing system 115. The depicted image 620 displays breast tissue feature 625. In an illustrative example, the exemplary image processing system 115 has estimated the breast tissue feature 625 Degree of Abnormality 630 as 48% based on image processing, image analysis, and Computer-aided Detection on the image 620. In the depicted example, the Degree of Abnormality 630 is identified as "Medium" by comparison with a predetermined threshold and indicated on a vertical colorized heat map extending to green near the center left from blue at the bottom left. In FIG. 6C, breast tissue image 635 has been captured by an exemplary image processing system 115. The depicted image 635 displays breast tissue feature 640. In an illustrative example, the exemplary image processing system 115 has estimated the breast tissue feature 640 Degree of Abnormality 645 as 94% based on image processing, image analysis, and Computer-aided Detection on the image 635. In the depicted example, the Degree of Abnormality 645 is identified as "High" by comparison with a predetermined threshold and indicated on a vertical colorized heat map extending to red near the top left from blue at the bottom left.

FIGS. 7A-7C depict an embodiment image processing system colorized lesion indication of the Degree of Abnormality of breast tissue images. In the illustrated example, the Degree of Abnormality is mapped to a Probability of Malignancy by the image processing system 115 as a function of tissue image features 140. In some implementations, the Degree of Abnormality may be added to metadata and stored with a related image in database 130. In the depicted embodiment, the colorized lesion indication may represent the Degree of Abnormality value in a lesion or feature image region shaded on a color spectrum, with blue being the lowest and red being the highest. In FIG. 7A, breast tissue image 705 has been captured by an exemplary image processing system 115. The depicted image 705 displays breast tissue feature 710. In an illustrative example, the exemplary image processing system 115 has estimated the breast tissue feature 710 Degree of Abnormality 715 as 16% based on image processing, image analysis, and Computer-aided Detection on the image 705. In the depicted example, the Degree of Abnormality 715 is identified as "Low" by comparison with a predetermined threshold and indicated as a blue-shaded feature image region. In FIG. 7B, breast tissue image 720 has been captured by an exemplary image processing system 115. The depicted image 720 displays breast tissue feature 725. In an illustrative example, the exemplary image processing system 115 has estimated the breast tissue feature 725 Degree of Abnormality 730 as 48% based on image processing, image analysis, and Computer-aided Detection on the image 720. In the depicted example, the Degree of Abnormality 730 is identified as "Medium" by comparison with a predetermined threshold and indicated as a green-shaded feature image region. In FIG. 7C, breast tissue image 735 has been captured by an exemplary image processing system 115. The depicted image 735 displays breast tissue feature 740. In an illustrative example, the exemplary image processing system 115 has estimated the breast tissue feature 740 Degree of Abnormality 745 as 94% based on image processing, image analysis, and Computer-aided Detection on the image 735. In the depicted example, the Degree of Abnormality 745 is identified as "High" by comparison with a predetermined threshold and indicated as a red-shaded feature image region.

Figure 8:
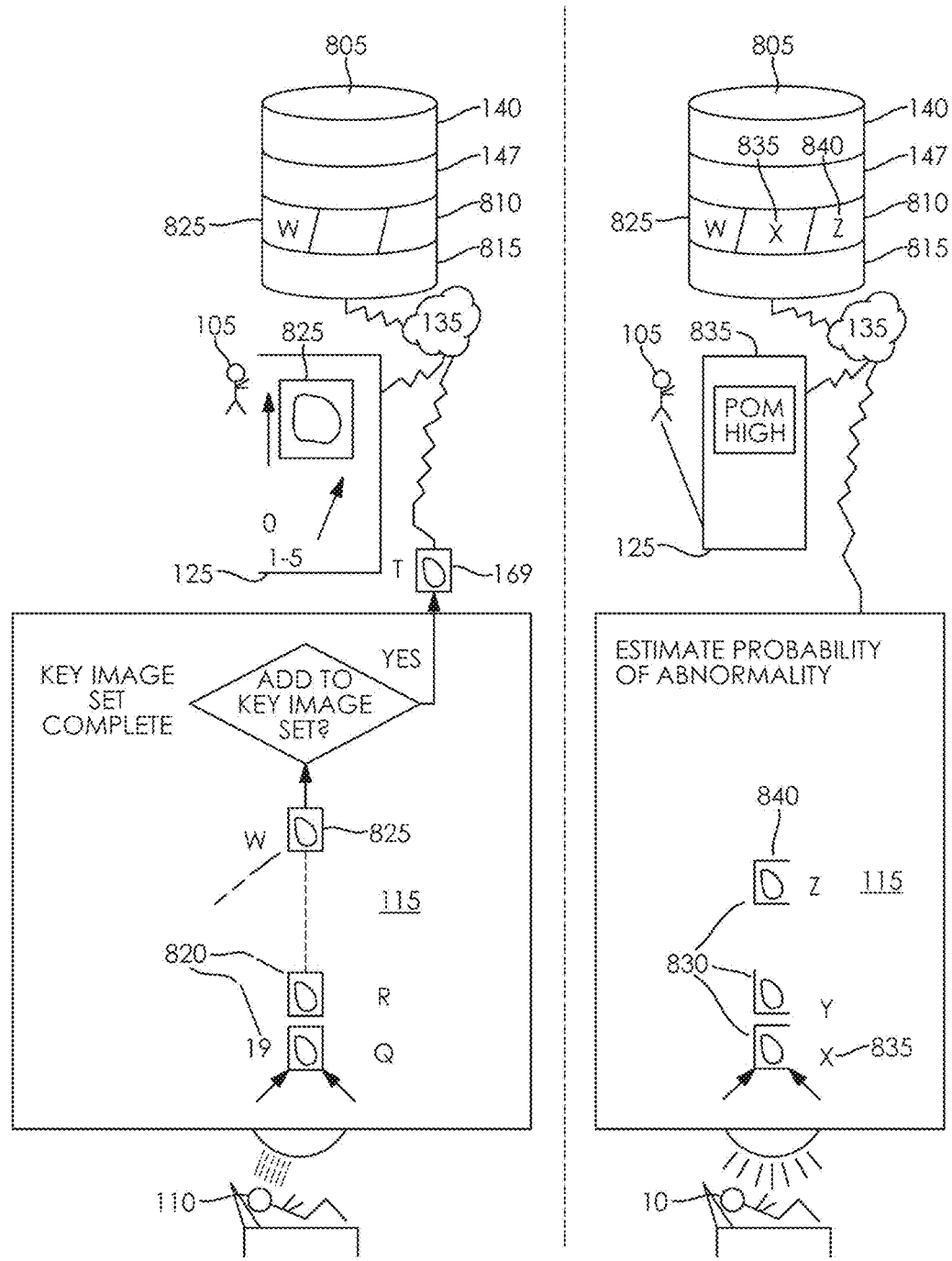
FIG. 8 depicts an exemplary image processing system automatically choosing radiological key images selected from a real-time series of captured tissue images as a function of predetermined key image set adequacy criteria until the key image set adequacy criteria are satisfied, and indicating a degree of abnormality determined based on Computer-aided Detection of the radiological key image set.

FIG. 8 depicts an exemplary image processing system automatically choosing radiological key images selected from a real-time series of captured tissue images as a function of predetermined key image set adequacy criteria until the key image set adequacy criteria are satisfied, and indicating a degree of abnormality determined based on Computer-aided Detection of the radiological key image set. In FIG. 8, operator 105 examines patient 110 using exemplary image processing system 115. The image processing system 115 is configured with imaging sensor 120 to capture a real-time series of images of patient 110. The image processing system 115 is configured with user interface 125 adapted to interact with the operator 105. In the depicted embodiment, the operator 105 may configure and direct image processing system 115 via the user interface 125 to perform imaging operations. In the illustrated example, the image processing system 115 may display images and results of image-based Computer-aided Detection to the operator 105 via the user interface 125. In the depicted example, the image processing system 115 is operably and communicatively coupled with database 805 and user interface 125 via network cloud 135. In an illustrative example, the depicted database 805 retains records representative of tissue features 140, key image set adequacy criteria 147, key image sets 810, and tissue diagnoses 815. In various embodiments, the tissue features 140 may include image features representative of diseased and healthy tissue, derived by image processing and pattern analysis techniques. In the depicted embodiment, the exemplary image processing system 115 captures a first series of images 820 of the patient 110 in a first patient orientation, using imaging sensor 120. In the depicted example, and for purpose of discussion, the first series of images 820 are labeled in alphabetic order Q, R, . . . W. In the illustrated embodiment, the image processing system 115 evaluates each of the first series of images 820 based on tissue features 140, key image set adequacy criteria 147, key image sets 810, and tissue diagnoses 815, to determine if the first series of images 820 satisfy key image set adequacy criteria 147 for the key image set being acquired. In the depicted embodiment, the key image set adequacy criteria 147 may include the imaging orientations and views needed for effective diagnosis based on the key image set being acquired. In the illustrated example, the image processing system 115 suggests imaging sensor 120 repositioning to the operator 105, via the user interface 125. In the depicted embodiment, the suggested imaging sensor 120 repositioning is determined by the image processing system 115 based on the imaging sensor orientation relative to at least one tissue feature required for an adequate key image set based on the key image adequacy criteria 147. In the depicted example, the image processing system 115 suggests imaging sensor 120 repositioning in a real-time vector display relative to a live image via the user interface 125. In the illustrated example, the operator 105 repositions the imaging sensor 120 and the image processing system 115 detects a required key image 'W' 825. In the illustrated embodiment, the required key image 'W' 825 is selected as a key image based on a determination by the image processing system 115 that the image 'W' 825 satisfies the key image adequacy criteria 147. In the depicted embodiment, the image processing system 115 stores the selected key image 'W' 825 in a key image set 810 in database 805.

In an illustrative example of automatically guiding operator 105 in repositioning imaging sensor 120 or patient 110 to acquire a complete key image set, the image processing system 115 continues to capture a second series of images 830 of the patient 110 in a second patient orientation, using the imaging sensor 120. In the depicted example, and for purpose of discussion, the second series of images 830 are labeled in alphabetic order X, Y, . . . Z. In the illustrated embodiment, the image processing system 115 evaluates each of the second series of images 830 based on tissue features 140, key image set adequacy criteria 147, and key image set 810 to determine if the second series of images 830 satisfy key image set adequacy criteria 147 to complete the key image set being acquired. In the depicted embodiment, the key image set adequacy criteria 147 include the imaging orientations and views needed for effective diagnosis based on the key image set being acquired. In the illustrated example, the image processing system 115 suggests imaging sensor 120 repositioning movement to the operator 105, via the user interface 125. In the depicted embodiment, the suggested imaging sensor 120 repositioning is determined by the image processing system 115 based on the imaging sensor orientation relative to at least one tissue feature required for an adequate key image set 810 based on the key image adequacy criteria 147. In the depicted example, the image processing system 115 suggests imaging sensor 120 repositioning in a real-time vector display relative to a live image via the user interface 125. In the illustrated example, the operator 105 repositions the imaging sensor 120 and the image processing system 115 detects a required key image 'X' 835. In the illustrated embodiment, the required key image 'X' 835 is selected as a key image based on a determination by the image processing system 115 that the image 'X' 835 completes the key image set 810 based on satisfying the key image adequacy criteria 147. In the depicted embodiment, the image processing system 115 stores the selected key image 'X' 835 in a key image set 810 in database 805.

In an illustrative example of automatically detecting disease based on a complete key image set, the image processing system 115 evaluates the key image set 810 in database 805. In the depicted embodiment, the image processing system 115 evaluates key images 'W' 825 and 'X' 835, based on Computer-aided Detection to determine a Degree of Abnormality. In the depicted embodiment, the image processing system 115 maps the Degree of Abnormality to a Probability of Malignancy determined as a function of the key mage set 810 and tissue features 140. In the illustrated example, the image processing system 115 determines the Probability of Malignancy is high, based on key images 'W' 825 and 'X' 835. In the illustrated example, the image processing system 115 indicates the high Probability of Malignancy to the operator 105 via the user interface 125. In some embodiments, the image processing system 115 may estimate a likely diagnosis determined as a function of the Probability of Malignancy, the tissue features 140, and the key image set 810. In the illustrated embodiment, the diagnostic image processing system 115 stores the high Probability of Malignancy with data representative of the diagnosis in diagnoses records 815 of database 805. In an illustrative example, the image processing system 115 continues to capture and evaluate a real-time series of images 820.

Figure 9:
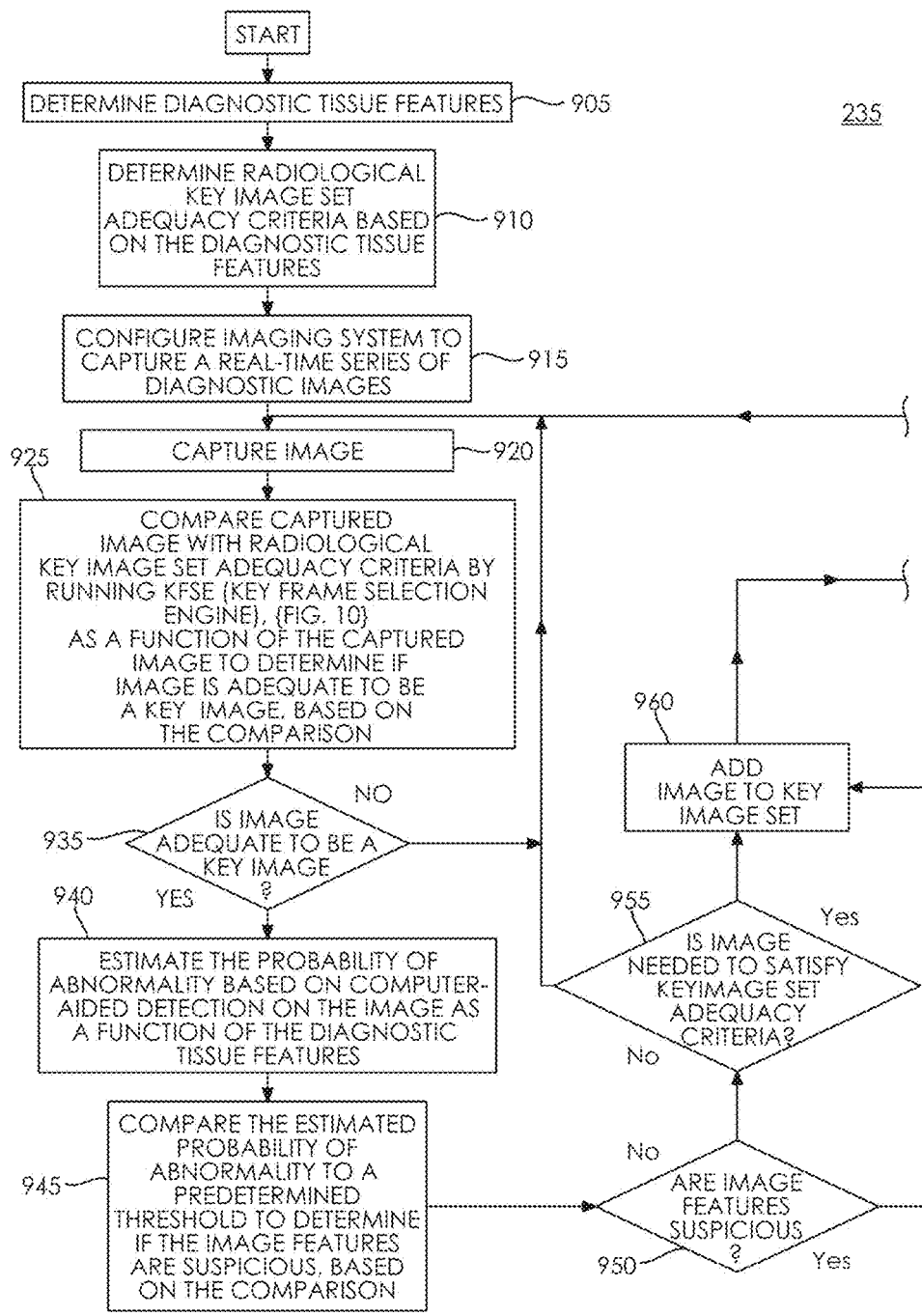
FIG. 9 depicts an illustrative process flow of an exemplary Image Acquisition Engine (IAE).
Figure 9:
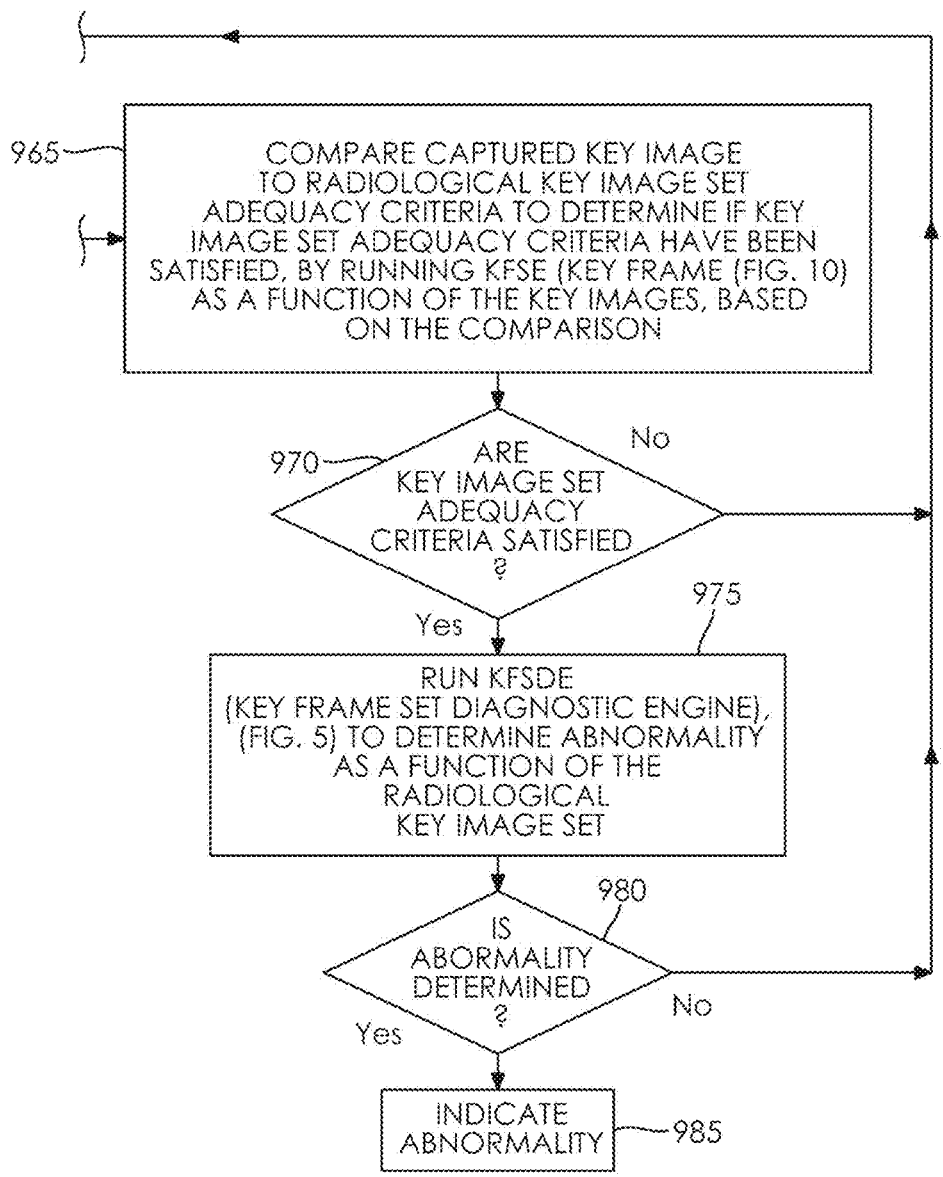

FIG. 9 depicts an illustrative process flow of an exemplary Image Acquisition Engine (IAE). In FIG. 9, an embodiment IAE 235 process flow is depicted automatically choosing radiological key images selected from a real-time series of captured tissue images. The method given in FIG. 9 is given from the perspective of the IAE 235 executing as program instructions on processor 205 of image processing system 115, depicted in FIG. 2. In some embodiments, the IAE 235 may execute as a cloud service governed by the processor 205 via network cloud 135. The depicted method begins at step 905 with the processor 205 determining diagnostic tissue features. The method continues at step 910 with the processor 205 determining radiological key image set adequacy criteria based on the diagnostic tissue features. The method continues at step 915 with the processor 205 configuring an imaging system to capture a real-time series of images. The method continues at step 920 with the processor 205 capturing an image. The method continues at step 925 with the processor 205 comparing the captured image with radiological key image set adequacy criteria by running KFSE (Key Frame Selection Engine) 240, (FIG. 10), as a function of the captured image to determine if the captured image is adequate to be a key image, based on the comparison. The method continues at step 935 with the processor 205 determining if the captured image is adequate to be a key image, based on the comparison by the processor 205 at step 925. Upon determination by the processor 205 at step 935 that the captured image is not adequate to be a key image, the method continues at step 920 with the processor 205 capturing an image. Upon determination by the processor 205 at step 935 that the captured image is adequate to be a key image, the method continues at step 940 with the processor 205 estimating the Probability of Abnormality based on Computer-aided detection on the image as a function of the diagnostic tissue features. The method continues at step 945 with the processor 205 comparing the estimated Probability of Abnormality to a predetermined threshold to determine if the image features are suspicious, based on the comparison. The method continues at step 950 with the processor 205 determining if the image features are suspicious, based on the comparison by the processor 205 at step 945. Upon a determination by the processor 205 at step 950 the image features are not suspicious, the method continues at step 955 with the processor 205 determining if the image is needed to satisfy key image set adequacy criteria. Upon a determination by the processor 205 the image is not needed to satisfy key image set adequacy criteria, the method continues at step 920 with the processor 205 capturing an image. Upon a determination by the processor 205 the image is needed to satisfy key image set adequacy criteria, the method continues at step 960 with the processor 205 adding the captured image to the key image set. Upon a determination by the processor 205 at step 950 the image features are suspicious, the method continues at step 960 with the processor 205 adding the captured image to the key image set. The method continues at step 965 with the processor 205 comparing the selected captured key images to radiological key image set adequacy criteria to determine if key image set adequacy criteria have been satisfied, by running KFSE (Key Frame Selection Engine) 240, (FIG. 10), as a function of the key image set, based on the comparison. The method continues at step 970 with the processor 205 determining if the key image set adequacy criteria have been satisfied, based on the comparison by the processor 205 at step 965. Upon a determination by the processor 205 at step 970 the key image set adequacy criteria have not been satisfied, the method continues at step 920 with the processor 205 capturing an image. Upon a determination by the processor 205 at step 970 the key image set adequacy criteria have been satisfied, the method continues at step 975 with the processor 205 running KFSAE (Key Frame Set Analytic Engine) 245, (FIG. 11) as a function of the key image set, to determine a Probability of Abnormality. The method continues at step 980 with the processor 205 performing a test to determine if a Probability of Abnormality was estimated at step 975 by the processor 205 running KFSAE (Key Frame Set Analytic Engine) 245, (FIG. 11) as a function of the key image set. Upon a determination by the processor 205 at step 980 that a Probability of Abnormality was not determined, the method continues at step 920 with the processor 205 capturing an image. Upon a determination by the processor 205 at step 980 that a Probability of Abnormality was determined, the method continues at step 985 with the processor 205 indicating the estimated Probability of Abnormality. In an illustrative example, the processor 205 may indicate the determined Probability of Abnormality via the user interface. In various implementations, the processor 205 may indicate the determined Probability of Abnormality to a cloud service via the network interface.

Figure 10:
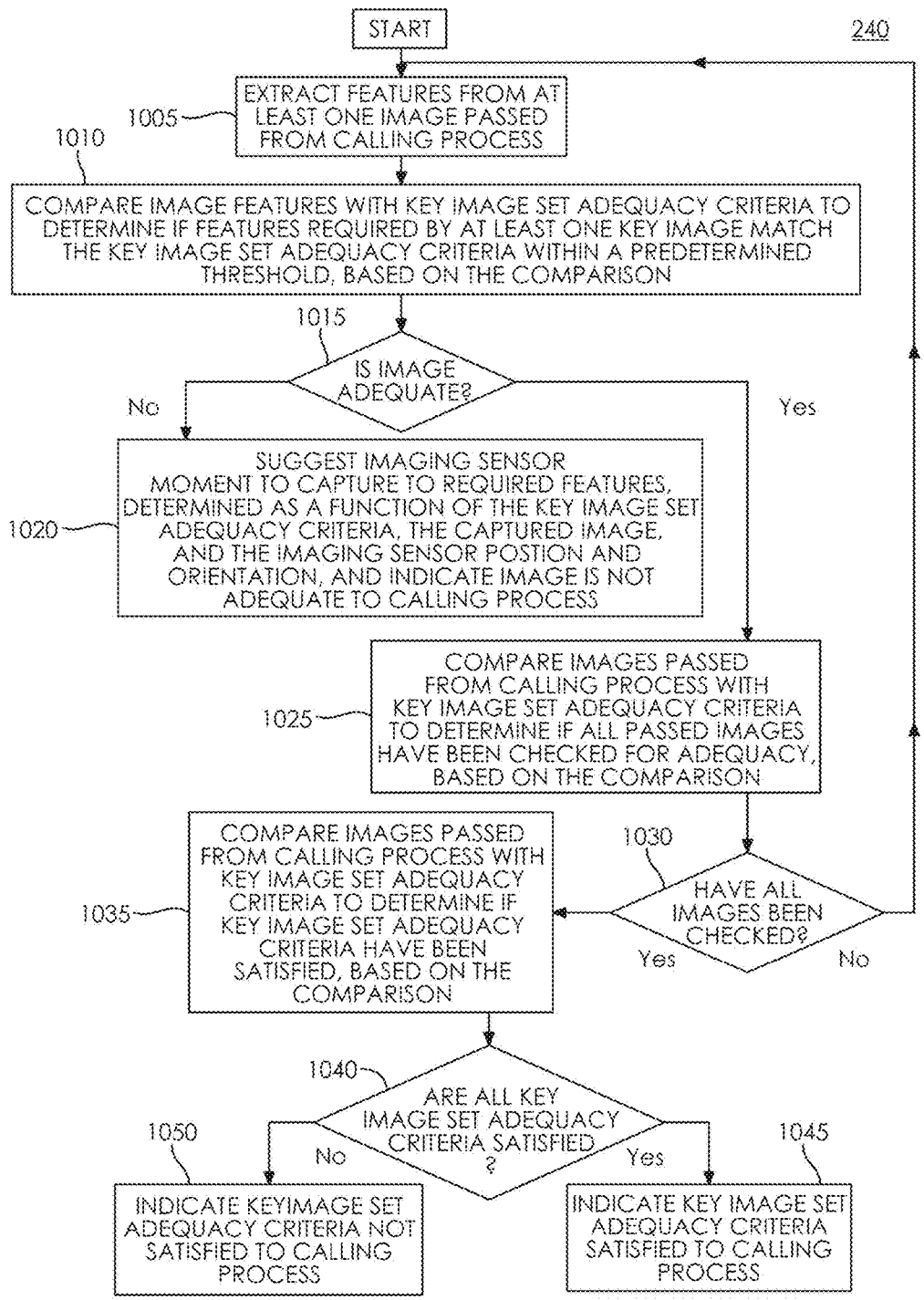
FIG. 10 depicts an illustrative process flow of an exemplary Key Frame Selection Engine (KFSE).

FIG. 10 depicts an illustrative process flow of an exemplary Key Frame Selection Engine (KFSE). In FIG. 10, an embodiment KFSE 240 process flow is depicted selecting key images from a real-time series of captured tissue images. The method given in FIG. 10 is given from the perspective of the KFSE 240 executing as program instructions on processor 205 of image processing system 115, depicted in FIG. 2. In some embodiments, the KFSE 240 may execute as a cloud service governed by the processor 205 via network cloud 135. The depicted method begins at step 1005 with the processor 205 extracting features from at least one image passed from the calling process. The method continues at step 1010 with the processor 205 comparing image features with key image set adequacy criteria to determine if features required by at least one key image match the key image set adequacy criteria within a predetermined threshold, based on the comparison. The method continues at step 1015 with the processor 205 determining if the image satisfies key image set adequacy criteria, based on the comparison by the processor at step 1010. Upon a determination by the processor 205 the image is not adequate as a key image, the method continues at step 1020 with the processor suggesting imaging sensor movement to capture required features, determined as a function of the key image set adequacy criteria, the captured image, and the imaging sensor position and orientation; and, indicating to the calling process the image is not adequate as a key image. Upon a determination by the processor 205 the image is adequate as a key image, the method continues at step 1025 with the processor 205 comparing images passed from the calling process with key image set adequacy criteria to determine if all passed images have been checked for adequacy, based on the comparison. Upon a determination by the processor 205 at step 1030 that all passed images have not been checked for adequacy, the method continues at step 1005 with the processor 205 extracting features from at least one image passed from calling process. Upon a determination by the processor 205 at step 1030 that all passed images have been checked for adequacy, the method continues at step 1035 with the processor 205 comparing images passed from calling process with key image set adequacy criteria to determine if key image set adequacy criteria have been satisfied, based on the comparison. Upon a determination by the processor 205 at step 1040 the key image set adequacy criteria have not been satisfied, based on the comparison at step 1035, the method continues at step 1045 with the processor indicating key image set adequacy criteria satisfied to the calling process. Upon a determination by the processor 205 at step 1040 the key image set adequacy criteria have been satisfied, based on the comparison at step 1035, the method continues at step 1050 with the processor indicating key image set adequacy criteria not satisfied to the calling process.

Figure 11:
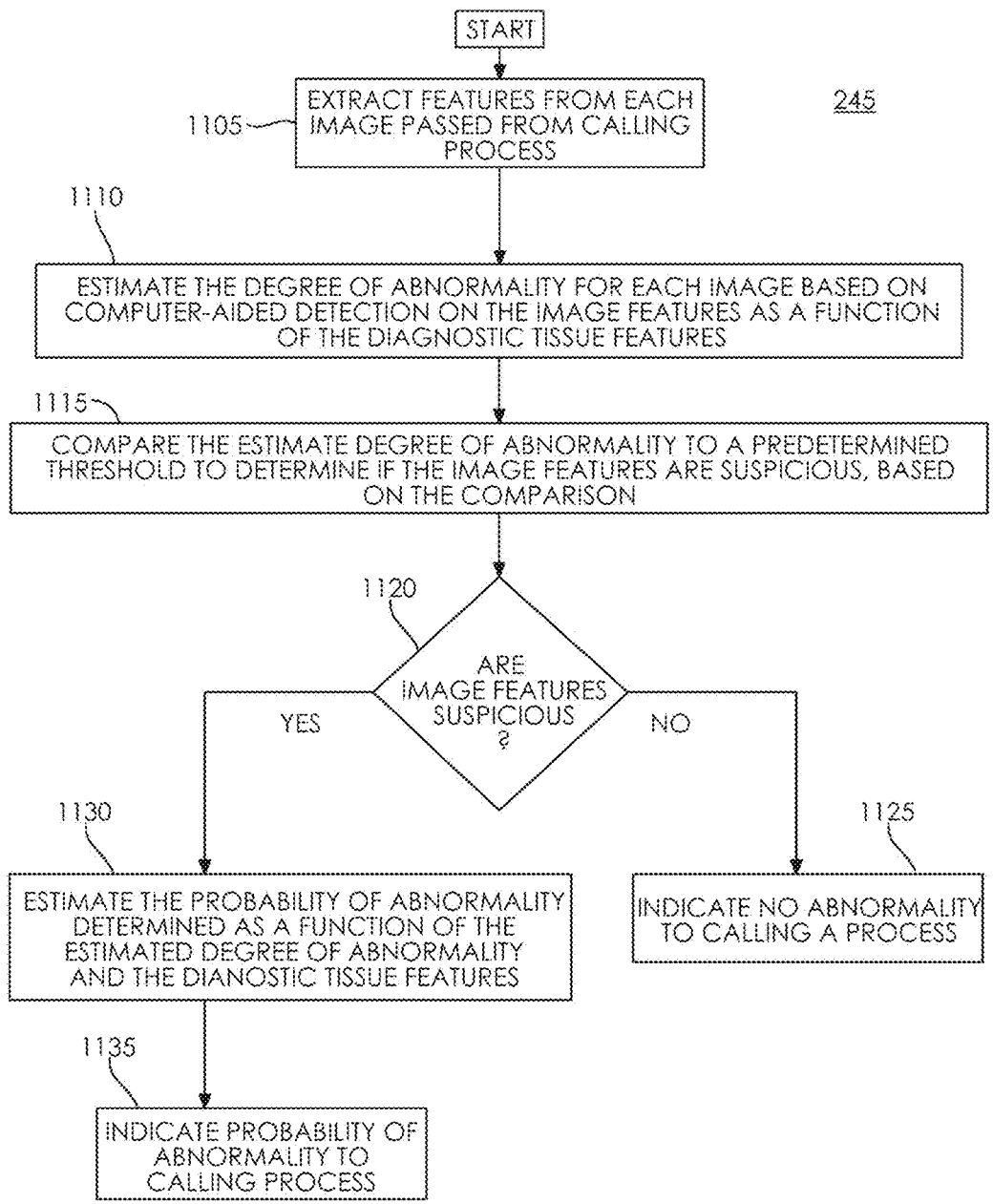
FIG. 11 depicts an illustrative process flow of an exemplary Key Frame Set Analytic Engine (KFSAE).

FIG. 11 depicts an illustrative process flow of an exemplary Key Frame Set Analytic Engine (KFSAE). In FIG. 11, an embodiment KFSAE 245 process flow is depicted determining a Probability of Abnormality based on Computer-aided Detection on a radiological key frame image set. The method given in FIG. 11 is given from the perspective of the KFSAE 245 executing as program instructions on processor 205 of image processing system 115, depicted in FIG. 2. In some embodiments, the KFSAE 245 may execute as a cloud service governed by the processor 205 via network cloud 135. The depicted method begins at step 1105 with the processor 205 extracting features from each image passed from a calling process. The method continues at step 1110 with the processor 205 estimating the Degree of Abnormality for each image based on Computer-aided detection on the image features as a function of the diagnostic tissue features. The method continues at step 1115 with the processor 205 comparing the estimated Degree of Abnormality to a predetermined threshold to determine if the image features are suspicious, based on the comparison. The method continues at step 1120 with the processor determining if the image features are suspicious, based on the comparison by the processor 205 at step 1115. Upon a determination by the processor 205 that the image features are suspicious, the method continues at step 1130 with the processor 205 estimating the Probability of Abnormality determined as a function of the diagnostic tissue features and the estimated Degree of Abnormality. The method continues at step 1135 with the processor 205 indicating the determined Probability of Abnormality to the calling process. Upon a determination by the processor 205 at step 1120 that the image features are not suspicious, the method continues at step 1125 with the processor 205 indicating no abnormality to the calling process.

Although various embodiments have been described with reference to the Figures, other embodiments are possible. For example, various embodiment methods may be used for choosing key images (or "worse" images, or "most suspicious" or "best displayed") of lesions in other areas of the body beyond breast cancer. In some designs, embodiment methods may be used for choosing key images (or "worse" images, or "most suspicious" or "best displayed") of other abnormalities beyond cancer lesions. In some examples, embodiment methods may be used for choosing key images (or "worse" images, or "most suspicious" or "best displayed") of non-human (animal or nonliving such as found in nondestructive testing applications) abnormalities.

Prior to embodiment methods and systems disclosed herein, either the physician had to be present for the entire US (Ultra Sound) procedure, or the physician had to trust the experience of the sonographer to capture the key images (or "worse" images, or "most suspicious" or "best displayed"). This was very dependent on the expertise of the sonographer and thus variable from site to site. In various implementations, embodiment methods may select key images automatically and thus the quality is consistent from site to site and the physicians time is not wasted being present for the entire exam, saving the physician's time for more value-added tasks.

In various implementations, computer algorithms may indicate a level of suspicion on a medical image (such as an Ultrasound Image of Breast Cancer) where non-radiologists perform the "live" scanning and only capture "key images" for later review by a radiologist.

For some scanning technologies (such as Ultrasound) the images are created live via a handheld scanner which the operator controls. This places a large amount of responsibility on the operator to orient the scanning device in such a way as to get the desired view of the object (abnormality) being scanned. Note that sometimes the desired view could be the "worst" view, meaning the view which shows the abnormality in its most severe, or most suspicious, visualization. Other times it is when the proper alignment of structures in 3D are visible in a single 2D plane. It can be appreciated that it requires a great deal of experience to be able to do this specific alignment and visualization.

Additionally, so much data is created as the operator moves the scanner around, and thus only "key images" are archived, where key images are snapshots of the live scans when the proper alignment occurs. Thus, the operator must first adjust the scanner to the proper orientation and secondly capture the proper image for archival and/or later review.

When a radiologist reviews the archived key images he/she is limited to the images archived by the original operator of the scanning device and is thus forced to make their clinical evaluation from that set of images. Sometimes the original operator has much experience and acquires acceptable key images showing the proper visualizations. However, many times the original operator is not experienced enough. In this case, either the quality of the case is compromised, or more often, the radiologist is forced to be the original operator of the scanning device. This has the disadvantages of being costlier to an already overburdened health care cost, and/or creating complex scheduling/workflow challenges in the radiologists' daily timetable.

Considering the application of Ultrasound for Breast Cancer, there is a known problem in the field that the Sonographer (radiology technologist that performs Ultrasounds) usually does not have the experience at visualizing the images to archive key images for the radiologists to detect breast cancer. It is believed that there are some highly experienced breast sonographers across the country, but in the vast majority of sites, the radiologists are called away from their normal workflow to perform the US scanning live so that they can trust the key images which are archived. It is also believed that the accuracy of the US exams are limited if/when radiologists are not available.

It would be desirable to create a method whereby less experienced sonographers could be utilized to capture the key images. However there needs to be a way to capture the proper key images as well as a way to indicate to the user when they are getting close to an orientation when the breast cancer appears the most malignant.

There are known Breast Ultrasound algorithms for detecting abnormalities. However, these algorithms have previously always just run on the already archived key images to help the radiologist with their clinical decision. In the proposed method these algorithms will run in "real time" on the scanning device, meaning they will run on every scanned image (or every 2nd, or every nth) and give feedback to the operator.

The results can be used in at least two ways: 1) A "probability" of malignancy (or probability of abnormality). This probability can be communicated to the operator in many ways (as a number is a text overlay on the screen, as a color mapping such as a heat scale, or others). The user may use this information for a number of different things: a. Choosing a key image to archive for later review when the abnormality appears as "bad" as possible; b. Indicating a structure to explore further with the handheld scanner. For example if the operator sees the "probability of abnormality" pop up sort of high, the operator may spend extra time in that areas further exploring for even more malignant looking viewing orientation. 2) Auto Key Image archiving. The algorithm can be used to automatically capture key images. Consider the probability of malignancy measure. If that value is stored for every image in the image stream, you could capture every peak in this stream of measures. You could even do it after "smoothing" the stream of probability measures. The automatically identified images could be sent straight to the long-term archive or reviewed by the operator to only archive the ones the operator approves.

While we used breast cancer detection with Ultrasound as the example to describe the algorithms, the method could be applied to other lesions or abnormalities for which an operator would scan. It could also be run on other scanning types other than Ultrasound, but also applies to scanning devices where the user controls the position and orientation of the scanning source. For example, CT and MRI scanners, are not operator dependent. The system controls the position and orientation of the scanned images and they are usually spaced in a manner to get complete coverage of a range of area.

In some embodiments, a UI may present the POM (Probability of Malignancy) level of a diagnostic image to a user. In various designs, the POM may be presented via a text display indicating, for example, a low (P.O.M 16%), a medium (P.O.M. 48%) and a high (P.O.M 94%). In various implementations, the POM may be presented via a heat scale. In some embodiments, the POM may be indicated by marking the area of a lesion in a heat scale type color.

In an illustrative example, the POM value of a series of images may be represented on a live, real-time graph as the operator is moving the handheld scanner around. In various implementations, the algorithm may automatically choose key images to archive and a graph such as this can represent the data use to choose the key images. In some examples, graph "peaks" may be local maximum, and not true global maxima. In various designs, key images may be selected based on eliminating local maximum by smoothing the data with a local moving window average, resulting in one maximum point.

In an illustrative example according to an embodiment of the present invention, the system and method are accomplished through the use of one or more computing devices. As depicted in FIG. 1, FIG. 2, and FIG. 8, one of ordinary skill in the art would appreciate that an exemplary diagnostic image processing system 115 appropriate for use with embodiments of the present application may generally be comprised of one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method to identify key images, comprising:
   determining tissue features based on tissue image diagnosis;
   determining radiological key image adequacy criteria based on the tissue features;
   adapting an imaging device to determine a degree of abnormality based on image features in an image; and,
   configuring an imaging system to estimate the key image degree of adequacy of an image as a function of image features and a degree of abnormality based on the image features, estimate the key image degree of adequacy for each of a real-time series of images captured by the imaging system, and identify key images based on the key image degree of adequacy estimated for the real-time series of images.

2. The method of claim 1, wherein the image features further comprise data representative of breast cancer tissue features.

3. The method of claim 1, wherein the method further comprises automatically identifying key images selected from the real-time series of images as a function of the image features and the key image adequacy criteria.

4. The method of claim 1, wherein identification of key images based on the key image degree of adequacy estimated for the real-time series of images further comprises selection of images having a degree of abnormality greater than a minimum degree of abnormality predetermined as a function of the tissue type.

5. The method of claim 1, wherein identification of key images further comprises: indicating the degree of abnormality to an operator; and, identifying a key image in response to operator selection of an image based on the degree of abnormality indicated to the operator.

6. The method of claim 1, wherein the imaging device further comprises a hand-held imaging sensor.

7. The method of claim 1, wherein: the imaging device is selected from the group consisting of ultrasound, MRI, CAT, PET, and X-Ray; and, adapting the imaging device to determine a degree of abnormality based on image features in an image further comprises implementing in the imaging device an image processing pipeline configured as a function of the imaging device type and the tissue type.

8. A method to identify breast cancer key images, comprising:
determining breast tissue features based on breast tissue image diagnosis;
determining breast cancer key image adequacy criteria based on the breast tissue features;
adapting an imaging device to determine a degree of abnormality based on image features in an image; and,
configuring an imaging system to estimate the breast cancer key image degree of adequacy of an image as a function of image features and a degree of abnormality based on the image features, estimate the breast cancer key image degree of adequacy for each of a real-time series of images captured by the imaging system, and identify breast cancer key images based on the breast cancer key image degree of adequacy estimated for the real-time series of images.

9. The method of claim 1, wherein the imaging device further comprises a hand-held imaging sensor.

10. The method of claim 8, wherein the method further comprises automatically identifying breast cancer key images selected from the real-time series of images as a function of the image features and the key image adequacy criteria.

11. The method of claim 8, wherein identification of breast cancer key images based on the breast cancer key image degree of adequacy estimated for the real-time series of images further comprises selection of images having a degree of abnormality greater than a minimum degree of abnormality predetermined as a function of the tissue type.

12. The method of claim 8, wherein the method further comprises indicating the degree of abnormality to an operator; and, identifying a key image in response to operator selection of an image based on the degree of abnormality indicated to the operator.

13. The method of claim 8, wherein: the imaging device is selected from the group consisting of ultrasound, MRI, CAT, PET, and X-Ray; and, adapting the imaging device to determine a degree of abnormality based on image features in an image further comprises implementing in the imaging device an image processing pipeline configured as a function of the imaging device type and the tissue type.

14. The method of claim 8, wherein the method further comprises providing a user interface adapted to select a key image based on operator input.

15. A system to identify breast cancer key images, comprising:
a database comprising breast cancer image features based on breast tissue image diagnosis, and breast cancer key image adequacy criteria based on the breast tissue features; and,
an imaging device communicatively coupled with the database, comprising:
a processor;
an imaging sensor adapted to capture an image, the imaging sensor operably and communicatively coupled with the processor;
a user interface adapted to receive input and indicate output, the user interface operably and communicatively coupled with the processor; and,
a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising:
capturing a series of real-time images;
evaluating the captured real-time images to estimate the degree of abnormality based on image features; and,
estimating the breast cancer key image degree of adequacy of a captured image as a function of image features and a degree of abnormality based on the breast tissue features for each image of a real-time series of images captured by the imaging system, and identifying breast cancer key images based on the breast cancer key image degree of adequacy.

16. The system of claim 15, wherein the imaging device further comprises a hand-held imaging sensor.

17. The system of claim 15, wherein: the imaging device is selected from the group consisting of ultrasound, MRI, CAT, PET, and X-Ray; and, the imaging device is further adapted to determine a degree of abnormality based on image features based on implementing in the imaging device an image processing pipeline configured as a function of the imaging device type and the tissue type.

18. The system of claim 15, wherein the operations performed by the processor further comprise: indicating the degree of abnormality to an operator based on a technique selected from the group consisting of text, heat map, and colorized lesion; and, identifying a key image in response to operator selection of an image based on the degree of abnormality indicated to the operator.

19. The system of claim 15, wherein estimating the degree of abnormality based on image features further comprises a technique selected from the group consisting of smoothing, low-pass filtering, moving-window averaging, and peak detection.

20. The system of claim 15, wherein: the imaging device further comprises an accelerometer; and, the operations performed by the processor further comprise to suggest, based on the accelerometer, imaging device movement to orient the imaging device to capture a diagnostic image based on satisfying the key image adequacy criteria.

* * * * *